US008837515B1

United States Patent
Cai et al.

(10) Patent No.: US 8,837,515 B1
(45) Date of Patent: Sep. 16, 2014

(54) SYSTEM AND METHOD FOR COLLISION RESOLUTION

(71) Applicant: FutureWei Technologies, Inc., Plano, TX (US)

(72) Inventors: Lin Cai, Schaumburg, IL (US); George Calcev, Hoffman Estates, IL (US); Lukasz Krzymien, Rolling Meadows, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/911,840

(22) Filed: Jun. 6, 2013

(51) Int. Cl.
*H04L 12/413* (2006.01)
*H04W 74/08* (2009.01)
*G08C 25/02* (2006.01)

(52) U.S. Cl.
CPC .................................. *H04W 74/0825* (2013.01)
USPC .......................................... 370/445; 714/748

(58) Field of Classification Search
None
See application file for complete search history.

(56) References Cited

U.S. PATENT DOCUMENTS

| 7,860,176 | B2 * | 12/2010 | Wu et al. ........................ 375/260 |
| 8,411,772 | B2 * | 4/2013 | Wu et al. ........................ 375/260 |
| 2003/0236080 | A1 * | 12/2003 | Kadous et al. ............. 455/226.1 |
| 2005/0088959 | A1 * | 4/2005 | Kadous ......................... 370/208 |
| 2005/0245197 | A1 * | 11/2005 | Kadous et al. ............. 455/67.13 |
| 2011/0041027 | A1 * | 2/2011 | Fong et al. ..................... 714/749 |
| 2011/0066911 | A1 * | 3/2011 | Yoshimoto et al. ........... 714/748 |
| 2011/0090941 | A1 * | 4/2011 | Li ................................. 375/219 |
| 2011/0126072 | A1 * | 5/2011 | Yoshimoto et al. ........... 714/751 |
| 2013/0070627 | A1 | 3/2013 | Chen et al. |
| 2014/0050140 | A1 * | 2/2014 | Fong et al. ..................... 370/312 |

OTHER PUBLICATIONS

"Performance Comparison of Hybrid-ARQ Schemes," TSG-RAN WG1#17, TSGR1#17(00)1396, Stockholm, Sweden, Oct. 20-24, 2000, Agenda Item: Adhoc#24, HSDPA, Source; Motorola, 7 pages.
"Part II: Wireless LAN MAC and Phy Specifications," Draft P802.11-REVmb/D12, IEEE, Nov. 2011, 21 pages.

* cited by examiner

*Primary Examiner* — Clemence Han
(74) *Attorney, Agent, or Firm* — Slater & Matsil, L.L.P.

(57) ABSTRACT

A method embodiment includes receiving, by a network device, collided first and second transmissions, signaling a retransmission request to a first source of the collided first transmission, receiving a retransmitted first transmission, and recovering the collided second transmission using the collided first and second transmissions and the retransmitted first transmission.

14 Claims, 4 Drawing Sheets

SYSTEM AND METHOD FOR COLLISION RESOLUTION

TECHNICAL FIELD

The present invention relates generally to a system and method for communications, and, in particular embodiments, to a system and method for collision resolution.

BACKGROUND

Generally, communication systems rely on coordination mechanisms to allow for the smooth operation of transmissions in shared access channels among multiple transmitters. For example, in wireless fidelity (WiFi) systems, under current IEEE 802.11 WLAN standards, a single communications channel may be shared by multiple stations (STAs). The transmission of data frames from the multiple STAs is coordinated by a distributed channel access function (e.g., a distributed coordination function (DCF) based on asynchronous distributed carrier sense multiple access with collision avoidance (CSMA/CA) mechanism).

Under this scheme, a STA with a data frame for transmission first performs a clear channel assessment (CCA) by sensing the wireless channel for a fixed duration of time (e.g., a DCF inter-frame space (DIFS)). If the STA senses the channel is busy, the STA waits until the channel is clear for an entire DIFS. The STA then further waits a random backoff period before transmitting the data frame. The random backoff period is implemented via a backoff timer having multiple backoff time slots, and the backoff timer decreases by one slot each time the channel is idle for a time slot. The backoff timer freezes whenever the STA senses the channel is busy. When the backoff timer reaches zero, the STA starts the frame transmission.

If the data is received successfully, the receiver (e.g., an access point (AP)) will indicate successful data receipt to the transmitting STA, for example, by sending an acknowledgement (ACK) frame. If the transmitting STA does not receive an ACK during a predetermined time interval, the transmitting STA assumes a collision has occurred and retransmits the data frame after another random backoff period. Each time a frame is not acknowledged, the transmitting STA doubles its backoff window in which a random backoff counter is selected, until the maximum backoff window is reached. This doubling of random backoff periods every time a transmission fails is known as exponential backoff.

Generally, this system works well for collision avoidance and resolution in systems where STAs can effectively sense other STAs using the channel. However, the system may not work well when transmitting STAs are hidden from each other (e.g., other STAs accessing the channel may be outside of a particular STA's sensing coverage). In systems having a large number of STAs the risk of hidden STAs may be quite high, and the number of collisions may be severe. Furthermore, while collision resolution using exponential backoff may reduce the probability of collisions in retransmission, a doubled backoff window leads to longer access delay and degrades the quality of service (QoS) performance of STAs. Additionally, each time a collision occurs, both colliding STAs must retransmit their data frames leading to inefficient channel utilization and wasted system resources (e.g., channel air time and battery power). In current WiFi systems, channel utilization efficiency could be less than 40% due to collisions and the involved collision avoidance and resolution overheads. That is, idle channel periods caused by the implementation of interframe spaces (e.g., DIFS) and random backoff periods may be relatively high.

SUMMARY OF THE INVENTION

These and other problems are generally solved or circumvented, and technical advantages are generally achieved, by preferred embodiments of the present invention, which provides a system and method for collision resolution.

In accordance with an embodiment, a method for collision resolution includes receiving, by a network device, collided first and second transmissions signaling a retransmission request to a source of the collided first transmission, receiving a retransmitted first transmission, and recovering the collided second transmission using the collided first and second transmissions and the retransmitted first transmission.

In accordance with another embodiment, a network device includes a processor, and a computer readable storage medium storing programming for execution by the processor. The programming including instructions to receive a first and a second transmission. The first and the second transmissions are collided. The programming includes further instructions to buffer the first and the second transmissions, partially decode the first transmission, transmit a retransmission request frame to a first source of the first transmission, successfully receive a retransmitted first transmission, and attempt to decode the second transmission using the buffered first and second transmissions and the retransmitted first transmission.

In accordance with another embodiment, a method for collision resolution includes transmitting, by a network device, a transmission. The network device retransmits the transmission in accordance with a first retransmission procedure when a retransmission frame for the transmission is received. A second retransmission procedure is started for the transmission when an acknowledgement frame is not received within a certain time period from a latest transmission time of the transmission. The second retransmission is cancelled when a delayed acknowledgement frame is received.

In accordance with yet another embodiment, a network device includes a processor, and a computer readable storage medium storing programming for execution by the processor. The programming including instructions to transmit, by a network device, a transmission, retransmit the transmission in accordance with a first retransmission procedure when a retransmission frame for the transmission is received, start a second retransmission procedure for the transmission when an acknowledgement frame is not received within a time period from a latest transmission time of the transmission, and cancel the second retransmission procedure when a delayed acknowledgement frame is received.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments are described in a specific context, namely a wireless fidelity (WiFi) network. Various embodiments may also be applied, however, to other random access networks such as Aloha, slotted Aloha, 0/1/p persistent CSMA (carrier sense multiple access, and the like.

Various embodiments include a collision resolution mechanism to improve transmission efficiency. The collision resolution mechanism may be implemented in combination with existing coordination schemes (e.g., coordination schemes using a distributed coordination function (DCF) based on asynchronous distributed carrier sense multiple access with collision avoidance (CSMA/CA) mechanism). A receiver (e.g., an access point (AP) network device) partially decodes a first data frame of a pair of collided frames when collision occurs to determine the source of the first data frame. The collided frames are buffered, and the receiver informs the source of the first data frame (e.g., a station (STA) network device) to retransmit the data using, for example, a negative acknowledgement (NACK) frame or by broadcasting information (e.g., reception time of the first data frame or sequence number) so that the source of the first data frame can identify itself and retransmit the data. After successfully receiving the retransmitted data, the receiver recovers the second data frame using the pair of collided frames and the retransmitted data (e.g., using successive interference cancelling (SIC) techniques). Based on the success of recovery, the receiver sends an acknowledgement (ACK) frame to either or both transmitters. Therefore, the source of the second data frame (e.g., a second STA) may not need to retransmit data the second data frame. Various embodiments allow for increased transmission efficiency because collisions may be resolved by having only one STA as opposed to both STAs retransmit collided data frames. Furthermore, the retransmission of the first data frame may be done immediately or after random backoff with a normal or a shortened backoff window, reducing the time required for collision resolution.

Figure 5:
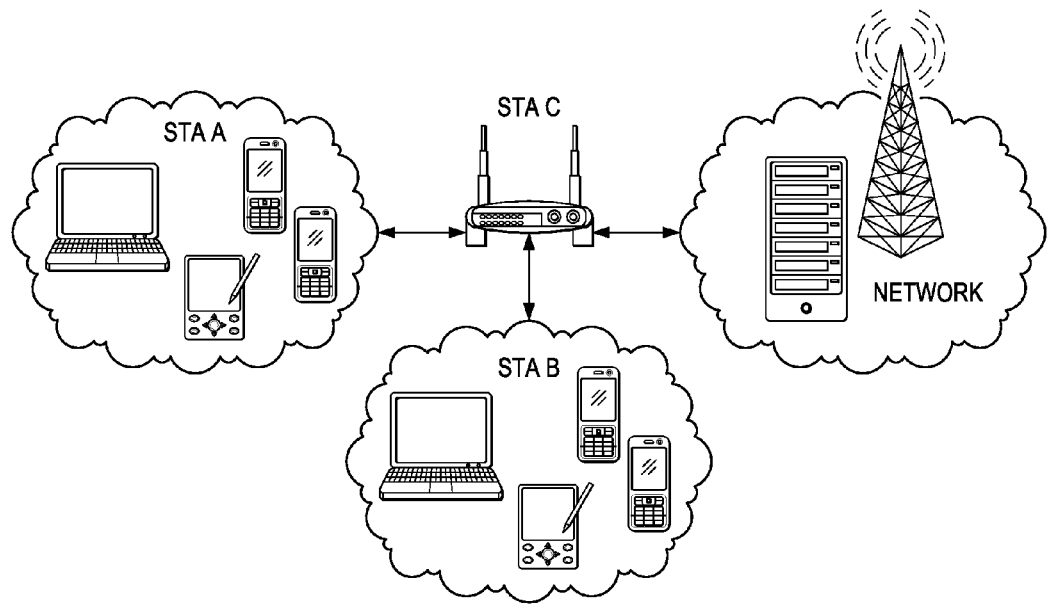
FIG. 5 is a block diagram of a network in accordance with various embodiments.
Figure 6:
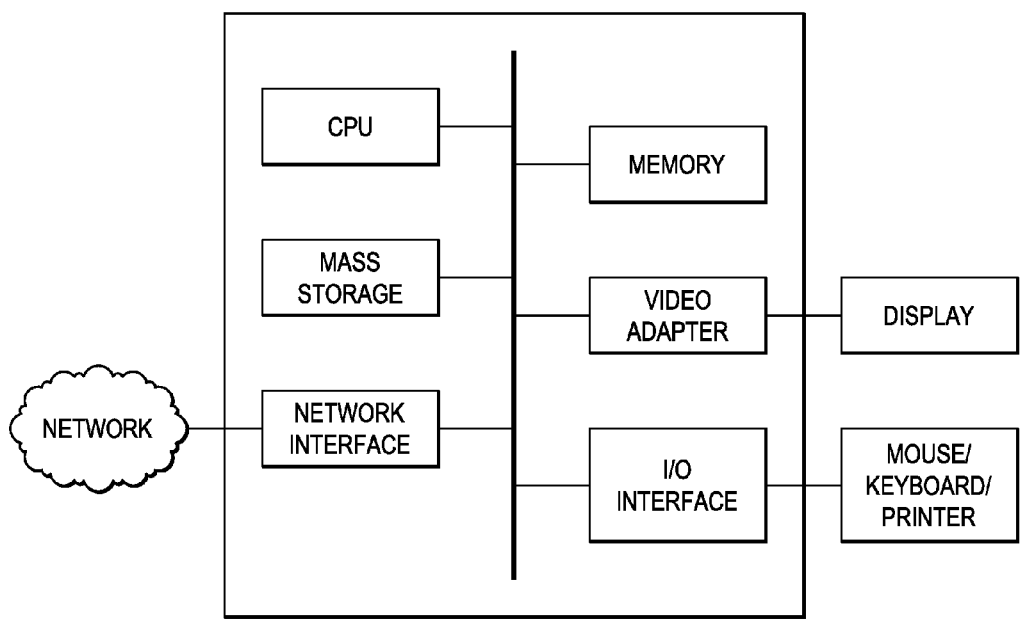
FIG. 6 is a block diagram of a computing system, which may be used to implement various embodiments.

FIG. 5 illustrates a block diagram of a WiFi network connection operation as is known in the art. Various STAs (e.g., STA A and STA B) connect to a wireless network (e.g., WiFi), using an access point (AP) such as STA C. STA C serves as a connection point between STAs A and B and a network (e.g., a wireless local area network (WLAN) in a fixed network or a wide area network (WAN)). Communications between STAs A, B, and C may be conducted over a shared channel coordinated by, for example, a distributed coordination function (DCF) based on asynchronous distributed carrier sense multiple access with collision avoidance (CSMA/CA) mechanism). Although FIG. 5 illustrates two STAs connected to a network using one AP, various embodiments may be applied to other networks having a different number of STAs and/or APs.

Figure 1A:
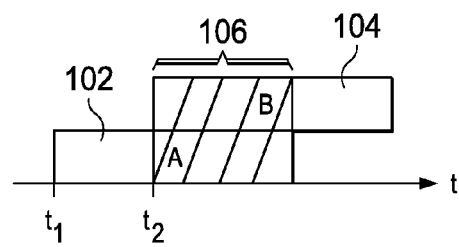
FIGS. 1A and 1B are flow diagrams of a collision resolution timeline in accordance with various embodiments.

FIG. 1A illustrates a block diagram of a pair of collided transmissions (e.g., data frames). Data frame 102 may be sent by a first transmitter (e.g., STA A), and data frame 104 may be sent by a second transmitter (e.g., STA B) using the same channel. Because of the random access nature of current WiFi networks, partial collisions are likely. That is, data frame 102 and data frame 104 do not fully overlap in the time domain because the two transmissions are sent at different times (i.e., times t1 and t2 respectively). Only portions 106 of data frames 102 and 104 are actually collided. Therefore, the receiver (e.g., STA C, which may be an AP) may be able to partially decode information from the collided frames and use the partially decoded information to determine relevant information such as the transmission source of the data frames, channel quality, transmission time, and the like.

Figure 1B:
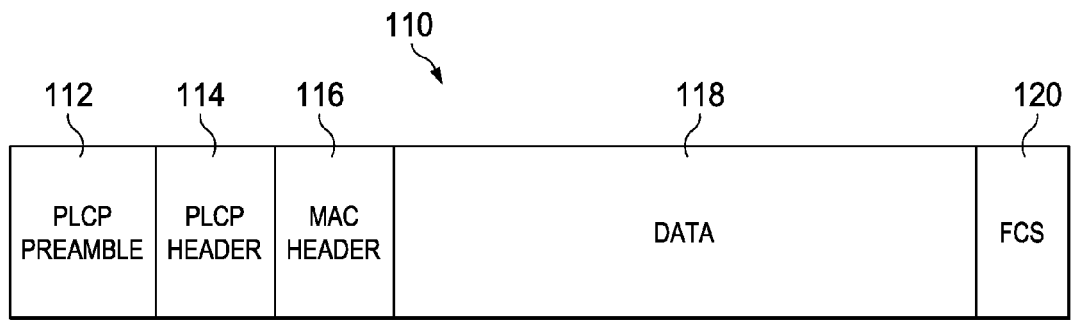

For example, FIG. 1B illustrates a block diagram of an example data frame format 110 used under current IEEE 802.11 standards. Data frames 102 and 104 may be formatted in accordance with format 110. Format 110 includes fields 112, 114, 116, 118, and 120 for a physical (PHY) layer convergence protocol (PLCP) preamble (12 symbols), a PLCP header (1 symbol), a medium access control (MAC) header (36 octets), data (up to 7951 octets), and a frame check sequence (FCS) (4 octets) respectively. Data frames are transmitted in the order illustrated in FIG. 1B. That is, PLCP preamble field 112 is transmitted first, PLCP header field 114 is transmitted second, and so on. In a typical network, the airtime of PHY header transmissions (e.g., PLCP preamble 112 and header 114) may be about 20 µs for legacy STAs or up to about 64 µs for high throughput STAs with eight spatial streams, and the airtime of MAC header 116 may be 48 µs or less. In contrast, the airtime of data 118 and FCS 120 may be in the order of hundreds of µs or more. Therefore, it is statistically likely that when collision occurs, the collided portion (i.e., portions 106) will start in data field 118 and the receiver (e.g., an AP) may be able to decode PLPC preamble 112, PLPC header 114, and/or MAC header 116. For example, even though frames 102 and 104 have collided, it is statistically likely that frame 102's PHY header and/or MAC header was successfully transmitted between times t1 and t2. The receiver may be able to decode these successfully transmitted portions to determine relevant information about frame 102 (e.g., its source).

Figure 2:
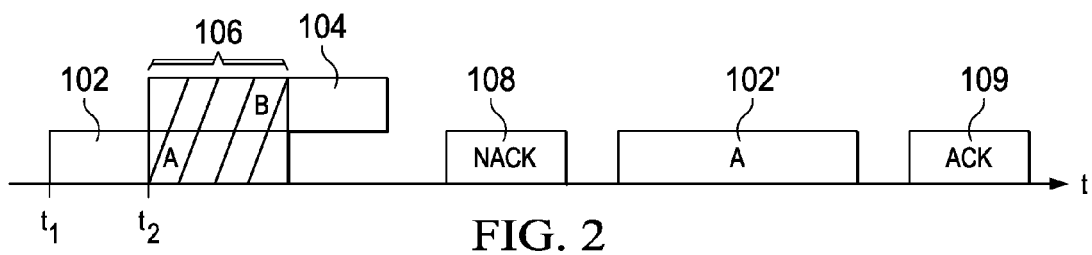
FIG. 2 is a an example transmission framework in accordance with various embodiments.

FIG. 2 illustrates a block diagram collision resolution at a receiver having received collided frames 102 and 104 depicted in FIG. 1 in accordance with various embodiments. The collision resolution procedure depends on the amount of information the receiver can successfully decode. For example, if the receiver can decode both the PHY and MAC headers of a frame (e.g., frame 102), the receiver is able to check whether it is the targeted receiver of the frame from the PHY header. The receiver may also determine the identity of the transmitter (e.g., STA A) from by decoding a MAC identification (ID) in the MAC header field of the transmission. The receiver may unicast a retransmission request frame (e.g., a negative acknowledgement (NACK) frame 108) to the source of the transmission (e.g., STA A) requesting a retransmission of the frame (e.g., frame 102). The retransmission request frame may include a MAC address of source of the transmission (e.g., STA A), a last transmission time of the requested data frame (e.g., frame 102), a sequence number of the requested data frame, combinations thereof, or the like.

If the receiver cannot decode the MAC header of the transmission, but is able to successfully decode all or portions of the PHY header, the receiver may broadcast a retransmission request frame (e.g., NACK frame 108) targeted toward the transmitter of the frame (e.g., STA A for data frame 102). The broadcast may include information from the PHY header that would allow a transmitter to identify itself as the targeted receiver of the retransmission request frame. For example, the broadcast may include time information (e.g., t1 for frame 102), an identifying sequence number, a hash of received information (e.g., association identifier, a cyclic redundancy check (CRC), and/or address of the transmitter), or the like regarding the collided transmission (e.g., frame 102).

In either scenario, the receiver buffers the received collided frames 102 and 104. Upon successful receipt of a retransmitted data frame 102' from STA A, the receiver may decode data frame 104 using frame 102' and buffered collided frames 102 and 104. The recovery procedure may include, for example, a successive interference cancellation technique. The successive interference cancellation technique may take into account any change in channel state information (represented by, for example, complex gains) between collided frames 102 and 104 and frame 102'. For example, the receiver may decode frame 102'. The receiver may then re-modulate and re-channel frame 102' using the channel state information of collided frame 102. The receiver may determine this channel quality information from the partially decoded portions of collided frame 102 by decoding its preamble. The receiver then subtracts the re-modulated and re-channeled frame 102' from the collided frames 102 and 104. That is, the receiver treats the re-modulated and re-channeled frame 102' as known interference in decoding frame 104. Alternatively, any suitable procedure for decoding individual signals from a composite signal may be used.

If data frame 104 can be successfully recovered and the receiver is the targeted receiver of data frame 104, the receiver acknowledges the proper reception of data frames 102 and 104 to both STAs A and B (e.g., by sending ACK frame 109 to both STAs A and B). If data frame 104 cannot be recovered successfully or if the receiver is not the targeted receiver of data frame 104, the receiver only acknowledges the proper receipt of data frame 102 to STA A. If the recovered data frame 104 is targeted to another receiver (e.g., a different AP), the receiver may simply discard the recovered data.

Although FIGS. 1A and 2 illustrates the collided data frames as being asynchronous transmissions, various embodiments may also apply to synchronous transmissions (i.e., where two collided transmissions were sent at the same time). Synchronous transmissions may include cases where the PHY header and/or MAC header of at least one of the collided transmissions can be decoded. For example, a PHY header/MAC header's channel quality requirement for successful decoding is generally lower than the channel quality required to decode data portions of a transmission. That is, even if data portions of a transmission cannot be fully decoded due to a collision, it may still be possible to decode the PHY header and/or MAC header of a transmission. In cases of synchronous transmissions, various collision resolution processes may be substantially similar to the processes used for asynchronous collisions.

Furthermore, various embodiments may also be applied to transmissions having multiple collided data frames (i.e., transmissions where three or more data frames collide). In the scenario where more than two data frames are collided, the receiver may iteratively decode the various collided frames. For example, suppose the receiver receives a transmission with three collided data frames. The receiver may send first retransmission request for a first collided data frame and recover the other two collided data frames using a retransmitted first data frame. The receiver may then decode the MAC and/or PHY header of the second data frame and send a second retransmission request for a second collided frame. Finally, the receiver may use the retransmitted second data frame to recover the third collided frame. Using this iterative approach, a receiver may recover all the collided data frames in a transmission.

At the transmitter side, if a unicast retransmission request frame is received, the targeted receiver of the retransmission request frame (i.e., the transmitter, STA A) will retransmit the data either as a priority or after a random backoff. Priority retransmission may include evaluating the channel for a short interframe space (SIFS) in accordance with IEEE 802.11 standards for sending priority transmissions. Retransmission time may be shortened by not using an exponential backoff procedure for retransmissions that are explicitly requested.

On the other hand, if a broadcast retransmission request frame is detected, the transmitter may first determine whether the retransmission request is for the data transmitted by the transmitter. For example, if the broadcast retransmission request frame includes a time index of the initial transmission, the transmitter may determine if it transmitted a data frame at the time index in the retransmission request. If so, then the transmitter determines it should retransmit the applicable data frame accordingly. If the receiver did not transmit a data frame at the time index in the broadcasted retransmission request, then the transmitter may disregard the retransmission request.

If no retransmission request frame is received, the transmitters may implement a legacy collision resolution procedure. For example, if a transmitter (e.g., STA B) does not receive a retransmission request frame, it will implement a CSMA/CA collision resolution mechanism and wait for an ACK frame. If the transmitter does not receive an ACK frame within a certain time period (e.g., before an ACK timer expires), the transmitter may retransmit the data using an exponential backoff procedure. However, the transmitter may cancel the retransmission procedure when a delayed ACK frame (i.e., an ACK received after the ACK timer expires) is received. Furthermore, under legacy collision resolution procedures, the transmitter may advantageously delay retransmission while the receiver signals a retransmission request frame to another transmitter (e.g., STA A) and receives a retransmitted frame (e.g., frame 102'). This may occur without the need to implement further procedures because an exponential backoff timer freezes whenever the channel is busy (e.g., while the channel is being used for retransmission from another STA) under existing procedures.

Figure 3:
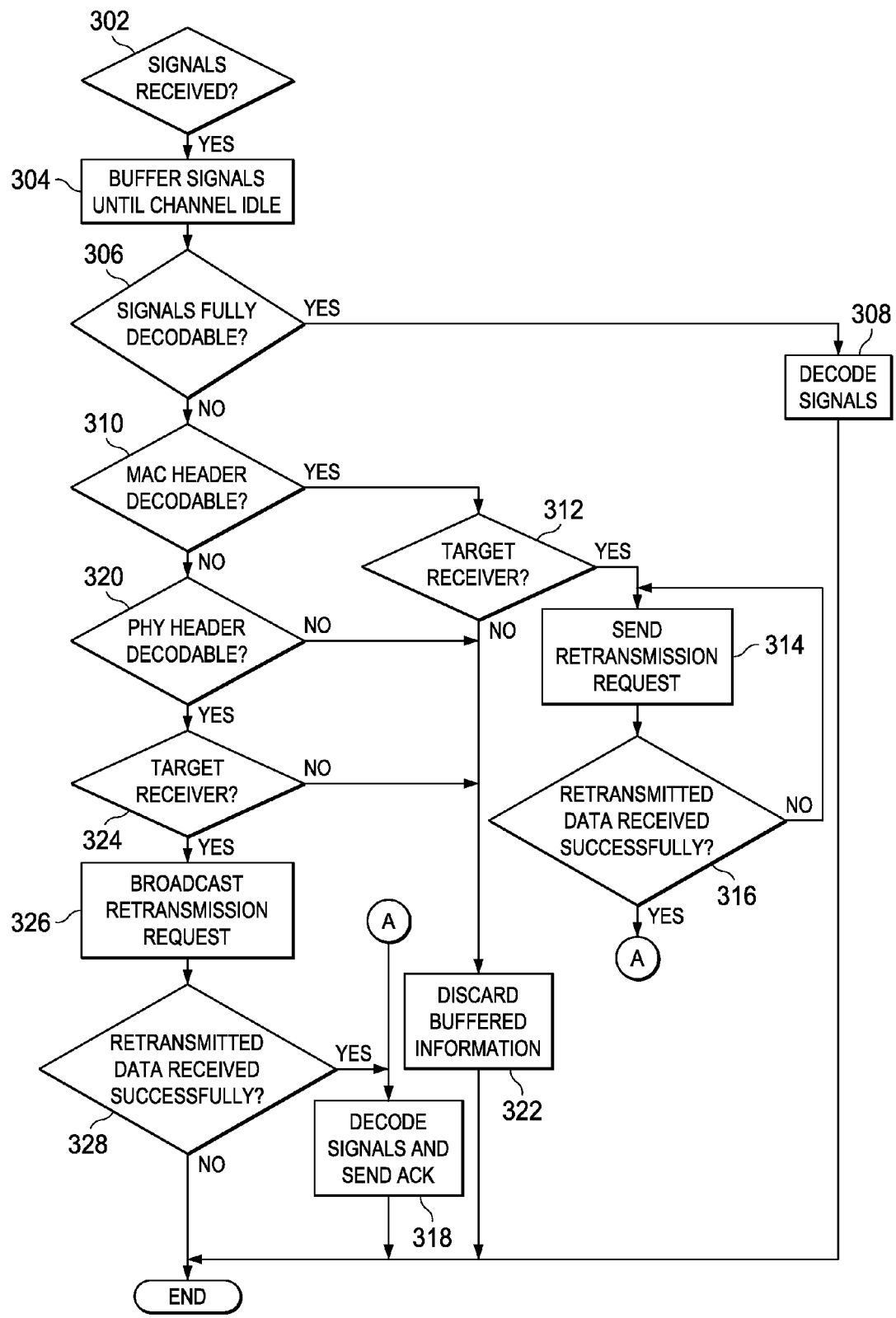
FIG. 3 is a flow diagram of receiver activity in accordance with various embodiments.

FIG. 3 illustrates a flow chart of receiver activity (e.g., an AP) in accordance with various embodiments. In step 302, the receiver waits for any incoming signals (i.e., transmissions). When a signal is received, in step 304, the receiver buffers the signals until the receiver senses the channel is idle (i.e., the signals have been completely received). In step 306, the receiver determines if the signals are fully decodable (e.g., if no collision occurred). If the signals are fully decodable, in step 308, the receiver decodes the signals. The receiver may also send an ACK frame to a source of the signals.

If the signals are not fully decodable (e.g., if a collision occurred), in step 310, the receiver determines if a MAC header is decodable. If the MAC header is decodable, in step 312, the receiver determines if it is the targeted receiver of the signals (e.g., from reading information in a PHY header). If the receiver isn't the targeted receiver of the signals, the receiver discards the buffered information in step 322. If the receiver is the targeted receiver of the signals, in step 314, the receiver sends a retransmission request frame to the transmitter of the signals. The receiver may determine the identity of the transmitter from reading a MAC address in the decoded MAC header. In step 316, the receiver waits until it successfully receives retransmission data successfully. As part of this waiting process, the receiver may send multiple retransmission requests until a successful retransmission is received. After the retransmission data is successfully received, in step 318, the receiver decodes the other frame in the collided signals and discards the buffered data. The receiver may decode the other frame using, for example, successive interference cancelling techniques. The receiver may also send ACK frames to any applicable transmitters of the signals.

If the MAC header is not decodable, the receiver determines if the PHY header is decodable in step 320. If not, in step 322, the receiver discards the buffered information and waits for further signals. If the PHY header is decodable, the receiver determines if it is the target receiver of the signals in step 324 from information in the PHY header. If not, again, the receiver discards the buffered information in step 322. If the receiver is the targeted receiver, then in step 326, the receiver broadcasts a retransmission request targeted towards a transmitter of the signals. The retransmission request contains identifying information about the signals. The identifying information may include, for example, the transmission time of the signals, an identifying sequence number, or the like. In step 328, the receiver waits for successful receipt of the retransmitted data. If the retransmitted data is not received successful (e.g., if no retransmission is received within a certain time interval), the receiver discards the buffered information. Otherwise, if the retransmitted data is successfully received, the received decodes the signals using the buffered information and the retransmitted data in step 318. The receiver may also send ACK frames to any applicable transmitters of the data.

Figure 4:
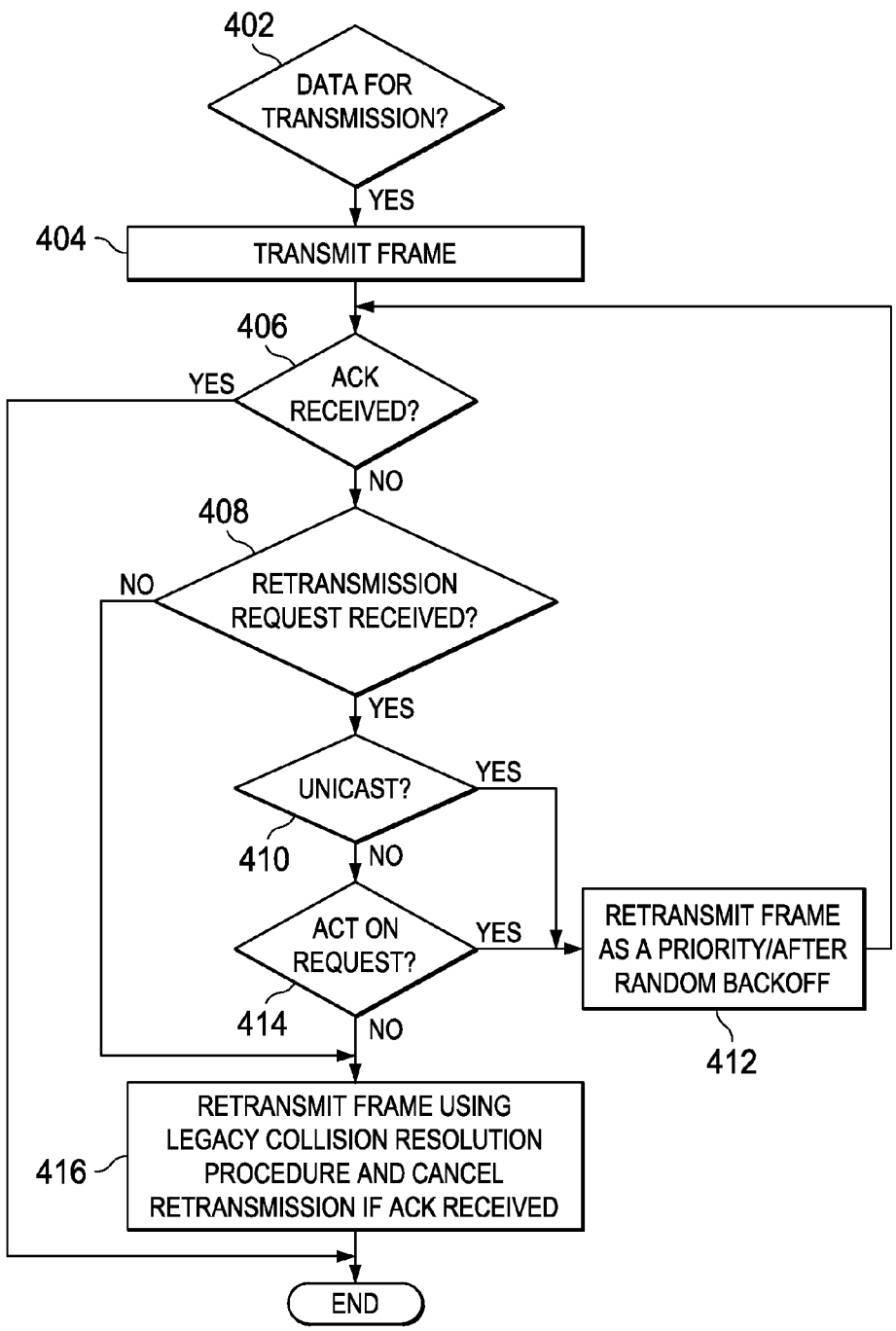
FIG. 4 is a flow diagram of transmitter activity in accordance with various embodiments.

FIG. 4 is a flow diagram of transmitter activity (e.g., a STA) in accordance with various embodiments. In step 402, the transmitter determines if it has any data for transmission. In step 404, the transmitter transmits the data. The data may be formatted so that a PHY header and MAC header of the transmission are transmitted before any data is transmitted using, for example, format 110 (see FIG. 1B). In step 406, the transmitter waits a certain time interval to receive an ACK frame from the receiver. If an ACK is received within the time interval, then the transmission was successful and the process is over. If an ACK is not received within the time interval (e.g., before an ACK timer expires), the transmitter determines if a retransmission request was received in step 408.

If a retransmission request was received, in step 410, the receiver determines if the retransmission request was unicast. If the retransmission request was unicast, the transmitter retransmits the frame either as a priority transmission (e.g., after a SIFS) or after a random backoff period in step 412.

If the retransmission request was not unicast (e.g., it was broadcasted), the receiver determines if retransmission request is for the data transmitted in step 404 using identifying information in the broadcast. For example, the broadcast may contain a time index of a transmission, and the receiver can determine if the transmission was sent at the time index. If the retransmission request is for the transmitted data (e.g., because the time index matches), then in step 412, the receiver retransmits the transmission either as a priority (e.g., after a SIFS) or after a random backoff period. If no retransmission request is received or if the receiver is not the target of a retransmission request, then the receiver retransmits the frame using legacy collision resolution procedures (e.g., using an exponential backoff) in step 416. However, if the receiver receives a delayed ACK frame, the receiver cancels the retransmission in step 416.

FIG. 5 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method for collision resolution comprising:
  receiving, by a network device, collided first and second transmissions;
  signaling a retransmission request to a first source of the collided first transmission;
  receiving a retransmitted first transmission; and recovering the collided second transmission using the collided first and second transmissions and the retransmitted first transmission.

2. The method of claim 1, further comprising sending a first acknowledgement to the first source; and sending a second acknowledgement to a second source of the second transmission when recovering the collided second transmission is successful and the network device is a targeted receiver of the second transmission.

3. The method of claim 1, further comprising buffering the collided first and second transmissions and decoding a portion of the collided first transmission.

4. The method of claim 3, wherein decoding the portion of the collided first transmission comprises determining the first source of the collided first transmission, and wherein signaling the retransmission request comprises unicasting the retransmission request to the first source.

5. The method of claim 3, wherein decoding the portion of the collided first transmission comprises decoding a transmission time, sequence identifier, hash data of a transmission address, hash data of an association identifier, or hash data of a cyclic redundancy check data of the collided first transmission, and wherein signaling the retransmission request comprises broadcasting a retransmission request including the decoded transmission time, sequence identifier, hash data of the transmission address, hash data of the association identifier, or hash data of the cyclic redundancy check.

6. The method of claim 1, further comprising receiving a first start of the collided first transmission at a first time frame; and receiving a second start of the collided second transmission at a second time frame, wherein the first time frame is prior to the second time frame.

7. The method of claim 1, wherein a first start of the collided first transmission and a second start of the collided second transmissions are received simultaneously.

8. The method of claim 1, wherein recovering the collided second transmission comprises a successive interference cancellation procedure.

9. The method of claim 1, wherein the collided first and second transmissions are collided with a third transmission, and the method further comprising recovering the third transmission using an iterative process.

10. A network device comprising:
a processor; and
a computer readable storage medium storing programming for execution by the processor, the programming including instructions to:
receive a first and a second transmission, wherein the first and the second transmissions are collided;
buffer the first and the second transmissions;
partially decode the first transmission;
transmit a retransmission request frame to a first source of the first transmission;
successfully receive a retransmitted first transmission; and
attempt to decode the second transmission using the buffered first and second transmissions and the retransmitted first transmission.

11. The network device of claim 10, wherein the programming includes further instructions to send an first acknowledgement frame to the first source; and send a second acknowledgement frame to a second source of the second transmission when the attempt to decode the second transmission is successful and the network device is a target receiver of the second transmission.

12. The network device of claim 10, wherein the first transmission is formatted in accordance with a data frame format comprising a physical layer convergence procedure (PLCP) preamble field, a PLCP header field, a medium access control (MAC) header field, and a data field.

13. The network device of claim 12, wherein the PLCP preamble, the PLCP header, and the MAC header fields are configured to be transmitted before the data field.

14. The network device of claim 10, wherein the retransmission frame comprises a MAC address of the first source of the first collided frame, transmission/reception time information of the first collided frame, a sequence number of the first collided frame, or combinations thereof.

\* \* \* \* \*